United States Patent [19]

Meehleder

[11] Patent Number: 5,474,330

[45] Date of Patent: Dec. 12, 1995

[54] TRAILER STABILIZING APPARATUS

[76] Inventor: John C. Meehleder, 5325 Sherman, Saginaw, Mich. 48604

[21] Appl. No.: 466,757

[22] Filed: Jun. 6, 1995

Related U.S. Application Data

[63] Continuation of Ser. No. 66,465, May 24, 1993, abandoned.

[51] Int. Cl.$^6$ .................................. B60S 9/08; B60S 9/22
[52] U.S. Cl. ........................................ 280/763.1; 254/424
[58] Field of Search .............................. 280/763.1, 765.1, 280/766.1, 475; 254/424

[56] References Cited

U.S. PATENT DOCUMENTS

| | | | |
|---|---|---|---|
| 3,355,136 | 11/1967 | Staples | 280/763.1 X |
| 3,537,724 | 11/1970 | Matthews | 280/763.1 |
| 3,692,329 | 9/1972 | Conner | 280/766.1 |
| 3,801,128 | 4/1974 | Herndon | 280/763.1 |
| 3,825,279 | 7/1974 | Schmeichel | 280/766.1 |
| 3,904,224 | 9/1975 | Belke | 280/475 X |
| 4,070,041 | 1/1978 | Brammer | 280/763.1 |
| 4,268,066 | 5/1981 | Davis | 280/763.1 |
| 4,708,362 | 11/1987 | Raetz | 280/763.1 |
| 4,824,136 | 4/1989 | Baxter | 280/475 |
| 4,905,953 | 3/1990 | Wilson | 280/763.1 X |
| 4,993,677 | 2/1991 | Patterson | 280/763.1 X |

FOREIGN PATENT DOCUMENTS

| | | | |
|---|---|---|---|
| 41726 | 11/1973 | Australia | 280/766.1 |
| 0530614 | 12/1921 | France | 280/763.1 |
| 0225473 | 5/1943 | Switzerland | 280/763.1 |
| 0939314 | 6/1982 | U.S.S.R. | 280/475 |

*Primary Examiner*—Brian L. Johnson
*Attorney, Agent, or Firm*—Learman & McCulloch

[57] ABSTRACT

Apparatus for stabilizing mobile homes and other towable motor trailers, when parked, includes a pair of stabilizing members engaging the vehicle at upper ends thereof and the ground beneath the vehicle at lower ends thereof. The stabilizing members are angularly adjustable relative to one another to enable positioning of the members in downwardly diverging angular relation to one another. An adjustable length chain extends between and interconnects the lower ends of the leg portions to retain them against outward angular movement once positioned. One or both of the leg portions are telescoping and selectively adjustable in length via an adjustment nut enabling increased end-to-end lengthening of the leg portions to exert lifting force pressure on the vehicle thereby stabilizing the vehicle and, if needed, leveling the vehicle.

9 Claims, 4 Drawing Sheets

TRAILER STABILIZING APPARATUS

This is a continuation of application Ser. No. 08/066,465 filed on May 24, 1993 and now abandoned.

This invention relates to stabilizing devices used for stabilizing motor homes, trailers and other wheeled vehicles, when parked, by providing rigid support between the vehicle and the ground beneath the vehicle, particularly to minimize the tendency of the vehicle toward rocking when persons move about the vehicle. Various such devices have been proposed, including conventional jack stands, screw jacks, and scissor jacks. Some of these known devices are very costly and none are considered to adequately laterally stabilize the vehicle because forces tending to rock the vehicle from side to side, or front to back, also cause these devices themselves to rock on their bases. The inherent lateral instability of such devices also renders them inadequate for stabilizing vehicles parked on non-level terrain, further limiting their practical usefulness.

SUMMARY OF THE INVENTION

Apparatus for stabilizing mobile trailers and other wheeled vehicles when parked comprises a pair of stabilizing members each of which has a leg portion extending longitudinally between upper and lower ends thereof. The upper ends have engaging means for engaging the vehicle and enabling relative lateral movement of the leg members, and the lower ends have base means for engaging the ground beneath the vehicle and supporting the leg portions in downwardly diverging angular relation to one another. At least one of the leg portions has length adjustment means for selectively increasing the end-to-end length of said leg portion and exerting pressure on the vehicle to partially lift and support the weight of the vehicle on the leg portions. Extending laterally between and interconnecting the leg portions adjacent their lower ends are connecting means for joining the legs in laterally braced relationship and for maintaining the leg portions in the selected downward angular position during lengthening of said leg portions.

The inventive stabilizing apparatus is less costly to manufacture and is easier to use than known prior stabilizing devices, and the angular arrangement of the connected leg portions provides a greatly improved lateral stability regardless of the terrain.

THE DRAWINGS

Other objects and advantages of the invention will become apparent from the following detailed description of several embodiments of the invention which are illustrated in the accompanying drawings, in which.

DETAILED DESCRIPTION OF THE DRAWINGS

Figure 1:
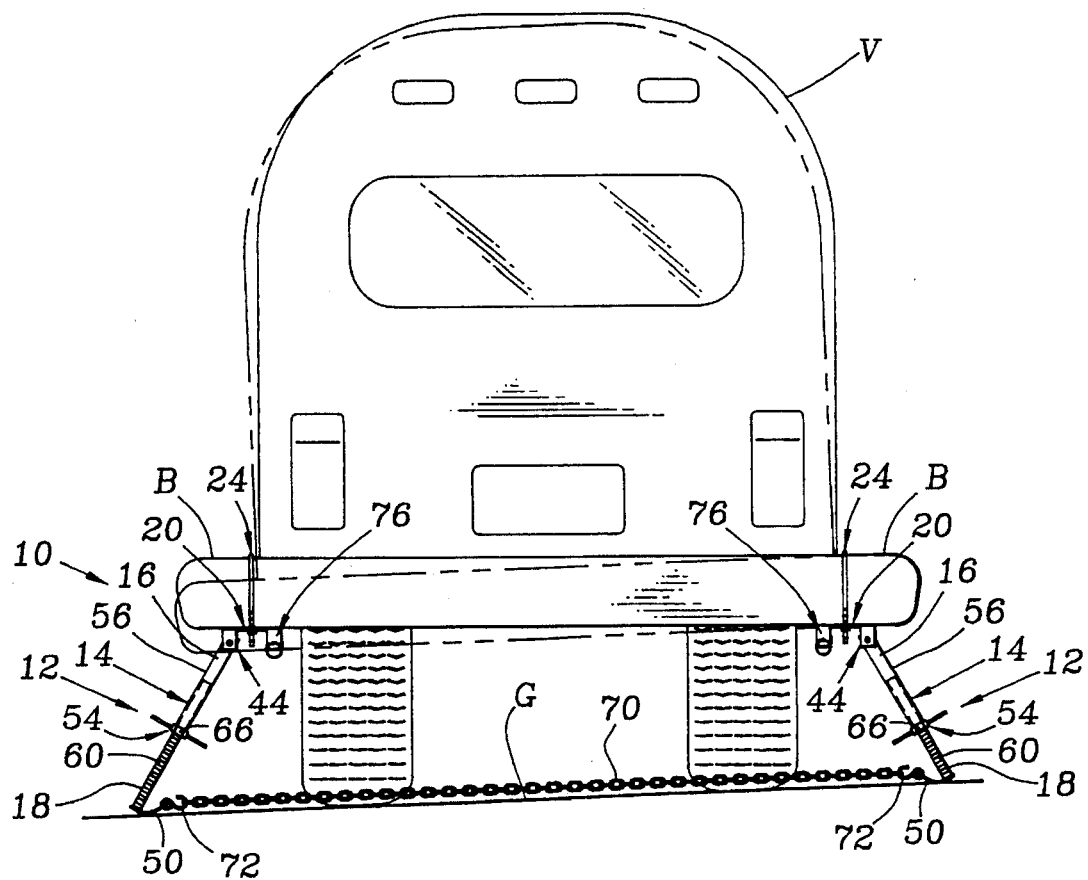
FIG. 1 is a front elevation view of a first embodiment of the invention shown mounted on and stabilizing a vehicle.

Stabilizing apparatus constructed according to three different embodiments of the invention are shown in the drawings and indicated generally by the reference character numerals of 10, 10', and 10", respectively. These apparatus are used for leveling and stabilizing wheeled vehicles, when parked, and particularly motor homes and towable trailers which serve as recreational dwelling quarters when parked. As occupants move about the vehicle, the shifting weight distribution has a tendency to rock the vehicle from side to side due to the yielding of the vehicle's suspension system. The inventive apparatus 10, 10' and 10" stabilize the vehicle by providing rigid support between the vehicle and the ground beneath the vehicle, isolating the vehicle from the rocking effects otherwise permitted by the suspension system.

Stabilizing apparatus constructed to the first embodiment of the invention is indicated at 10 in FIGS. 1–5 and comprises a pair of spaced apart stabilizing members 12 each having a leg portion, generally designated 14, extending longitudinally between upper 16 and lower 18 ends thereof.

The upper ends of the leg members 16 include engaging means 20 for engaging a structural rigid component of the vehicle V, such as the vehicle's frame or bumper assembly B, preferably at locations adjacent the sides of the vehicle. The engaging means 20 further enables the leg portions 12 to move relatively laterally for adjusting the spacing between the lower ends 18 of the leg sections 12, as will be explained in greater detail below.

In the first embodiment 10, the engaging means 20 comprises a pair of identical mounting brackets 22 associated with each leg portion 14. The brackets 22 are provided with mounting means 24 for mounting the brackets 22 securely to a rigid structural component of the vehicle, such as the vehicle's bumper assembly B. When mounted, the brackets 22 are unable to move relative to the vehicle or one another.

Figure 2:
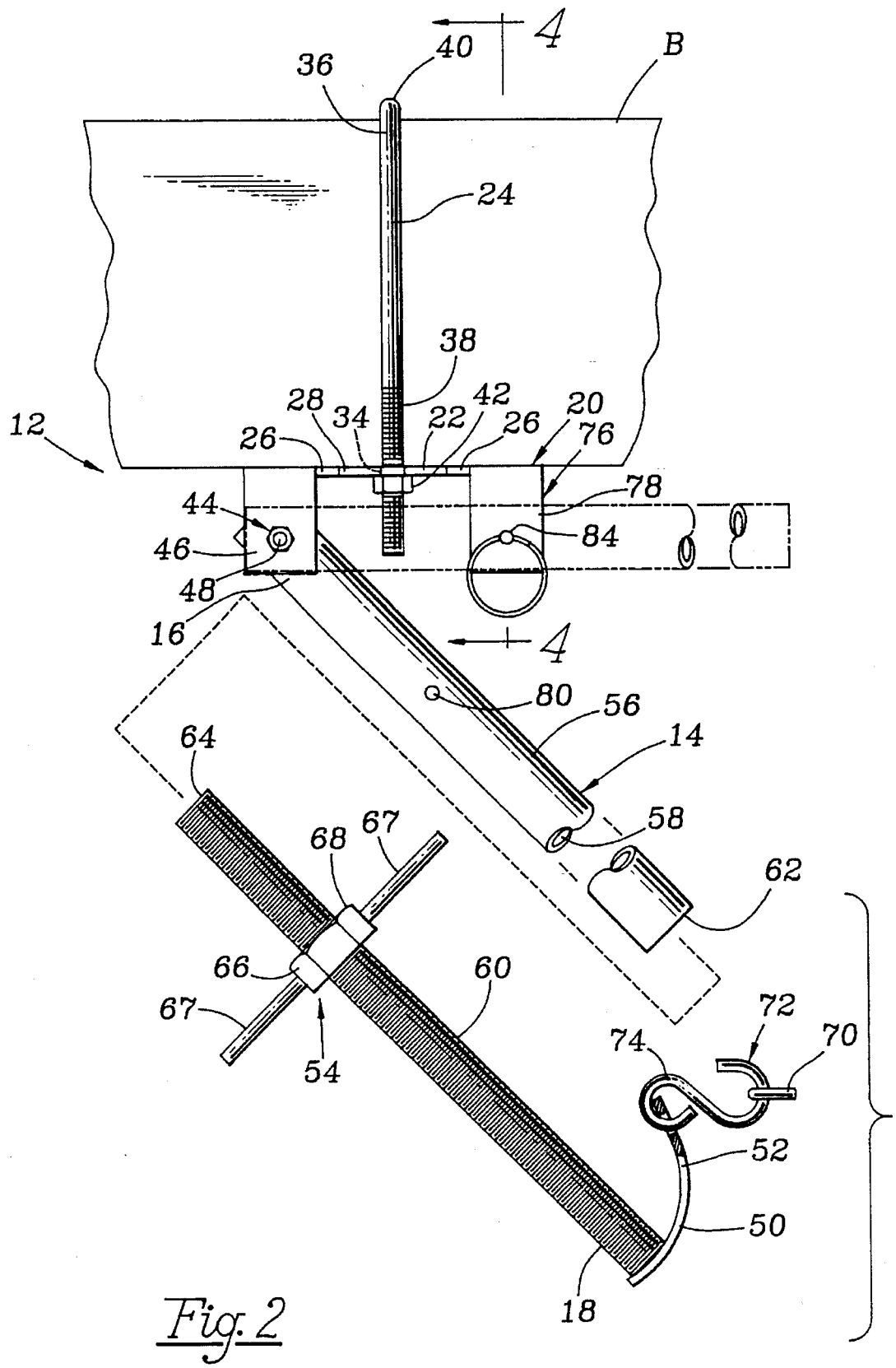
FIG. 2 is an enlarged fragmentary front elevation view of a stabilizing member of FIG. 1.
Figure 4:
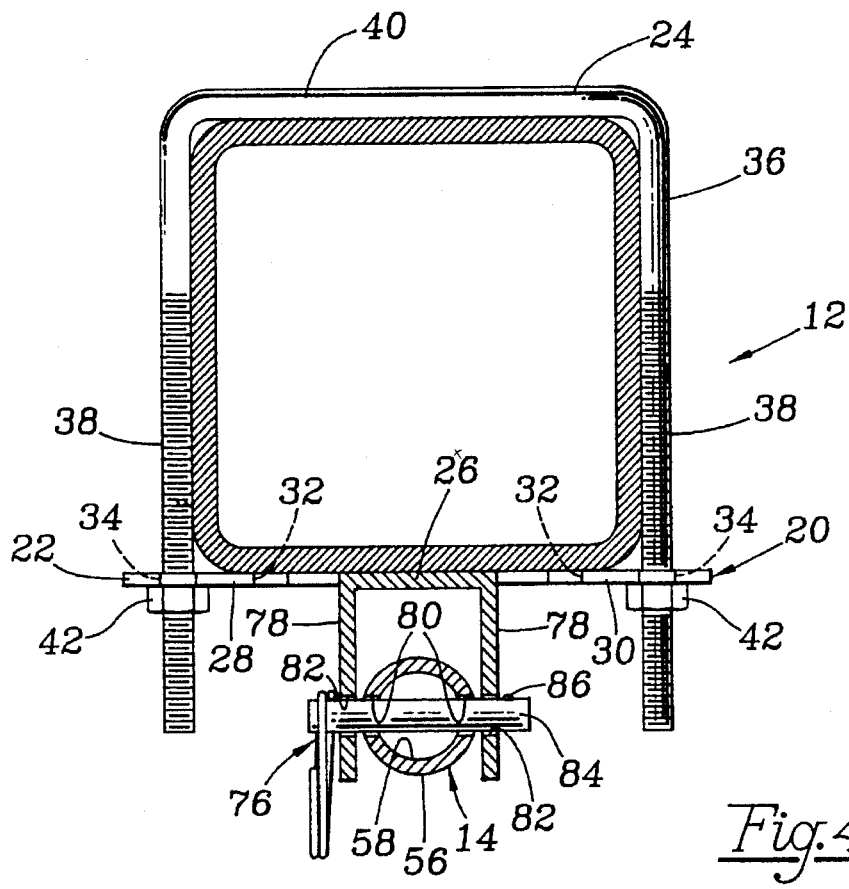
FIG. 4 is a transverse sectional view taken along lines 4—4 of FIG. 2.
Figure 3:
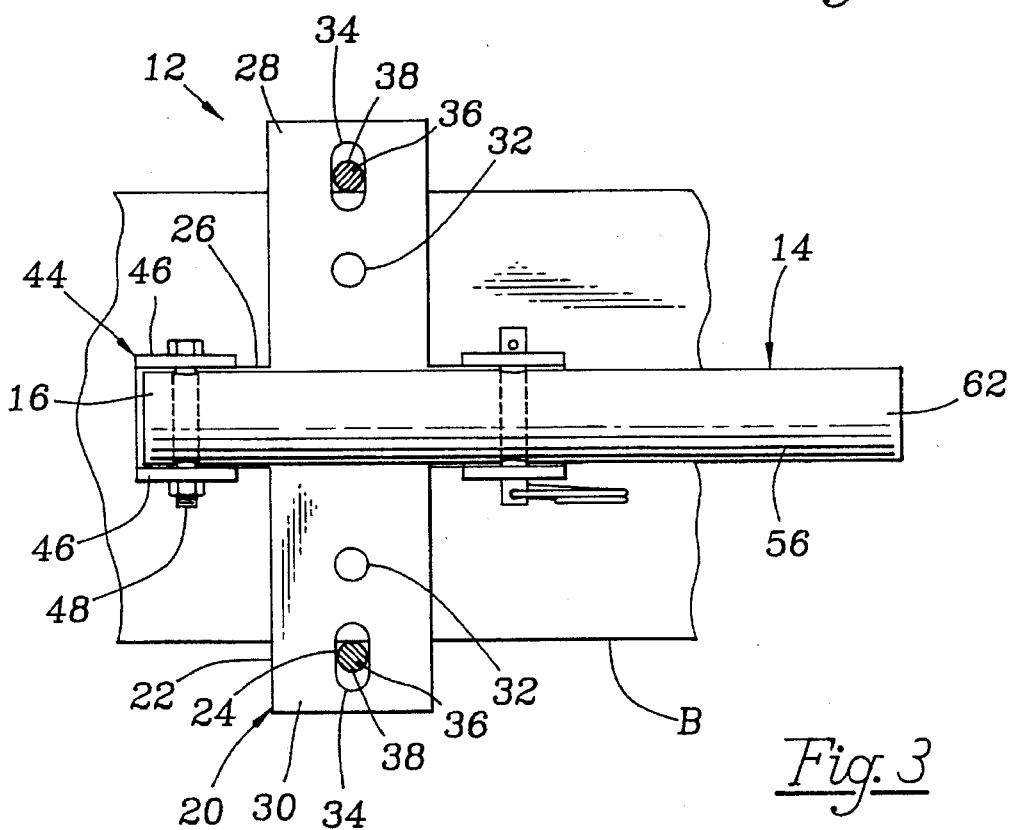
FIG. 3 is a fragmentary bottom view of the stabilizing member of FIG. 2 with the leg portion shown in the stowed position.

As shown in FIGS. 2–4, each bracket 22 has a generally rectangular main body portion 26 extending longitudinally between opposite ends in the same general plane as its respective leg portion 14 and lengthwise of the bumper B. A pair of lateral mounting arms 28, 30 project from opposite sides of the main body portion 26 intermediate the ends of the main body portion 26 and are preferably formed from a single piece of flat metal plate material. An upper surface of the main body portion 26 and the mounting arms 28 and 30 are adapted to engage an underside of the bumper B when mounted. The mounting arms 28, 30 include at least one set and preferably a pair of mounting apertures 32 and 34, spaced a fixed distance from one another for accommodating different size bumpers B as will be explained below.

The mounting means 24 further includes a U-bolt fastener 36 having a pair of threaded arms 38 spaced a fixed distance apart corresponding to the spacing of the first or second set of apertures 32, 34, depending on the size of the bumper B on which the brackets 22 are to be mounted. Most motor homes and towable house trailers typically have, as part of their bumper assembly, a square metal tube extending from side to side of the vehicle and in which a large diameter sewage drain hose is accommodated when not in use. A cross section of the tubing B is shown in FIG. 4 and will vary in size depending on the size and make of the vehicle. Typically, however, such vehicles are equipped with either a three inch or a four inch O.D. bumper tube B.

The U-bolt 36 is selected according to the size of the bumper tube B and as such the spacing between the threaded arms 38 will typically be approximately either 3 or 4 inches, respectively. As shown best in FIG. 4, the threaded arms 38 extend along opposite sides of the bumper tube B and are joined integrally by a connecting portion 40 extending along a top surface of the bumper tube B opposite the bracket 22. The aperture pairs 32 and 34 are spaced to receive the threaded arms 38 for a three inch and four inch bumper application, respectively, as shown in FIG. 4, such that together, the U-bolt 36 and mounting bracket 22 encircle the outer perimeter of the bumper tube B. In this way, the mounting hardware for each bracket 22 does not extend into the bumper tube B leaving the interior of the tube B unencumbered for receiving the drain hose. A nut 42 is threaded onto each of the U-bolt arms 38 and enables the bumper tube B to be clamped between the mounting bracket 22 and connecting portion 40 of the U-bolt 36 to thereby secure the mounting bracket 22 against movement relative to the bumper tube B. Before tightening the nuts 42, however, the U-bolt 36 enables the associated stabilizing member 12 to be slid along the bumper tube B to the desired position preferably adjacent the side ends of the bumper tube B.

Each of the mounting brackets 22 has pivot connection means 44 pivotally connecting each of the leg portions 14 to their respective brackets 22 for enabling the leg portions 14 to pivot freely relative to their brackets 22 and angularly toward one another. A pair of pivot arms 46 project downwardly from a first end of the main body portion 26 at right angles to the upper surface of the main body portion 26 and are spaced sufficiently apart to accommodate the upper end 14 of the respective leg portion 14 therebetween. The pivot arms 46 are welded or otherwise secured to the main body portion and preferably are formed integrally with the main body portion from the same material. A pivot pin 48 connects the upper end 16 of the respective leg portion 14 pivotally to the pivot arms 46 enabling the leg portion 14 to pivot relative to the mounting bracket 22 to enable adjustment in the spacing between the lower ends 18 of the leg portions 14 while fixing the upper ends 16 of leg portions 14 against lateral movement toward and away from one another.

The leg portions 14 extend generally downwardly from the mounting brackets 22 and the lower ends 18 are provided with base means 50 for engaging the ground G beneath the vehicle and supporting the leg portions 14 in downwardly diverging angular relation to one another as shown in FIG. 1. In other words, the leg portions 14 extend downwardly from their brackets 22 and outwardly of one another at an angle such that the upper ends 16 of the leg portions 14 are nearer to one another than are the lower ends 18 thereby forming a downwardly diverging angle between the leg portions 14.

The base means 50 comprises an arcuate foot or shoe welded or otherwise fixed to the lower end of the respective leg portion 14. The feet 50 project laterally inwardly of the leg portions 14 and have a lower ground-engaging surface that is curved upwardly toward the leg portions 14 enabling the leg portions 14 to be supported on the ground at an angle with respect to one another.

At least one, and preferably both, of the leg portions 14 are provided with length adjustment means 54 for selectively increasing the end-to-end length of the leg portions 14 as will be explained in greater detail below. The length adjustment means 54 includes an outer cylindrical sleeve section 56 forming the upper sections of leg portions 14 having a smooth cylindrical passageway 58 therein within which an associated externally threaded extension rod section 60 forming the lower portion of each leg portion 14 is slideably received in telescoping fashion such that the rod 60 is freely slideable and extendible into and out of the sleeve section 56 through an open end 62 thereof.

Each sleeve section 56 is secured at an upper end thereof to one of the mounting brackets 22 by one of the pivot pins 48 so as to be fixed longitudinally with respect to the bracket 22 and extends downwardly therefrom and terminates at the open end 62. Each extension rod 60 is secured at a lower end thereof to one of the feet 50 and extends upwardly therefrom and terminates at an upper end 64. The external threads of rods 60 may extend entirely or only part way between the ends of the rod 60. The outer diameter of the rod 60 and the diameter of the passageway 58 are selected so that the threaded rod 60 is able to be inserted and slid into the passageway 58 while being supported by the walls of the passageway 58. Thus, the outer diameter of the rod 60 is slightly smaller in diameter than the passageway 58, enabling the rod 60 to slide freely in passageway 58.

An internally threaded adjustment nut 66 is threaded on the extension rod 60 for selective longitudinal movement therewith. The internal screw threads of the adjustment nut 66 coact with the external threads of the extension rod 60 enabling the adjustment nut 66 to rotate relative to the extension rod 60 and thereby advance toward either the upper or lower end of the rod 60.

The end-to-end length of leg portions 14 maybe increased by rotating the adjustment nut 66 so that it advances toward the upper end 64 of the rod 60. As the nut 66 advances along the rod 60, an upper face 68 of the nut 66 engages the open end 62 of the sleeve 56 and, with further turning, reacts forcibly between the sleeve section 56 and the extension rod 60 to extend the rod 60 in prolongation of the sleeve section 56, thereby increasing the overall effective length of leg portion 14. In other words, as the nut 66 rotates relative to the extension rod 60 and sleeve section 56, the rod section 60 is forced to telescope further out of the sleeve section 56 causing the sleeve section 56 and hence the vehicle V to be raised or lifted a corresponding amount whereupon the stabilizing members 12 bear a portion of the weight of the vehicle V.

To stabilize the vehicle V when parked, an attendant positions the individual leg portions 14 so that they extend downwardly and outwardly of one another each forming approximately a 15°–30° angle with respect to vertical. The rod sections 60 are bodily extended in prolongation of the sleeve section 56 until the feet 50 of the leg portions 14 engage the ground beneath the vehicle V. Once positioned, the leg portions 14 are tautly interconnected adjacent their lower ends 18 by connecting means 70 which preferably is an inelastic flexible steel link chain 70 for restraining the lower ends 18 of the positioned leg portions 14 against outward movement relative to one another.

Depending on the particular angle selected for the leg portions 14, the spacing or distance between the lower ends 18 may vary. Adjustable coupling means 72 are provided to one or both leg portions 14 to enable adjustment in the effective length of the chain 70 between the lower end leg portions 14 to accommodate the varying distance between the leg portions. The adjustable coupling means 72 comprises a catch 74 secured to one or both feet 50 of leg portions 14 and detachably engaging any selected one of a plurality of links of the chain 70. The catch 74 may comprise an S-hook or other equivalent device that would enable detachable engagement with the chain 70. One end of the chain 70 may be fixed to one of the stabilizing members 12 such as by welding while the other stabilizing member may be provided with the detachable catch 74 or, as shown in FIG. 1, both stabilizing members 12 may be provided with the removable catch 74 enabling the chain 70 to be separated from each of the stabilizing members 12.

Once coupled, the leg portions 14 may be further lengthened to stabilize and if need be, level the vehicle. Stabilizing the vehicle involves exerting a force between the ground G and the vehicle V via the stabilizing members 12 so as to slightly lift the vehicle V forming a rigid support between the vehicle V and the ground G. Stabilization effectively isolates the vehicle from rocking effects normally attributed to the shifting weight of occupants as they move about the vehicle. As described previously, the leg portions 14 are lengthened by turning the adjustment nuts 66 on the rods 60 to advance them toward the sleeve sections 56. The adjustment nuts 66 react between the threads of the rods 60 and the free end 62 of the sleeve sections 56 to force the rod sections 60 to extend further out of the sleeve sections 56 thereby exerting a lifting force on the vehicle V. The nuts 66 are each provided with laterally extending handle projections 67 to enable the attendant to bodily turn the nuts 66 by hand to make the opposite adjustments.

Because the leg portions 14 are arranged in downwardly diverging angular relationship to one another, the weight of the vehicle V will tend to force the lower ends 18 of the leg portions 14 outwardly. However, the chain 70 tensions under load to restrain the leg portions 14 against such outward movement. The angular arrangement of the leg portions provides lateral stability to the vehicle V restraining the vehicle against side-to-side rocking movements.

If the vehicle V is parked on non-level ground, as illustrated in FIG. 1, the stabilizing members 12 may further be used to level the vehicle V by controlling the relative amount of adjustment of the leg portions 14. FIG. 1 shows the vehicle V adjusted from an initially non-level position shown in phantom lines to a level position shown in solid lines by extending the left side leg portion more than the right side to both level and stabilize the vehicle.

It is contemplated that for most motor homes and towable trailers, a set of the stabilizing members 12 will be mounted near the back of the vehicle, as shown in the Figures, and another set mounted near the front of the vehicle, and used in similar fashion.

To release the stabilizing members 12 from the stabilizing condition, one simply turns the adjustment nuts 66 in the opposite direction taking the load off the leg portions 14. Conveniently, rod sections 60 and adjustment nuts 66 may be separated from the sleeve sections 56 by simply sliding the rod sections 60 out of the sleeve sections as shown in FIG. 2 for storage. The chain 70 may also be disconnected for storage.

The mounting brackets 22 are provided with releasable latch means 76 for releasably latching the sleeve sections 56 of the leg portions 14 in a generally horizontal stowed position (shown in phantom in FIG. 2 and illustrated in FIGS. 3 and 4) when not in use. The latch means 76 includes a pair of latching arms 78 projecting downwardly from the mounting bracket 22 at the end of the main body portion 26 opposite the pivot connection 44 and spaced sufficiently to enable accommodation of the sleeve sections 56 between the latching arms 78. The sleeve sections 56 and latching arms 78 have apertures 80, 82 which align when the sleeve sections 56 are in the stowed position and which accommodate a keeper pin 84 extended through the apertures to releasably connect the sleeve sections 56 to the respective latching arm 78. The keeper pin 84 has a spring loaded button 86 that is normally biased outward to retain the pin 84 connected to the latching arms 78 and sleeve section 56. The button 86 is recessable axially into the pin 84 to enable removal of the pin 84 when needed.

Figure 6:
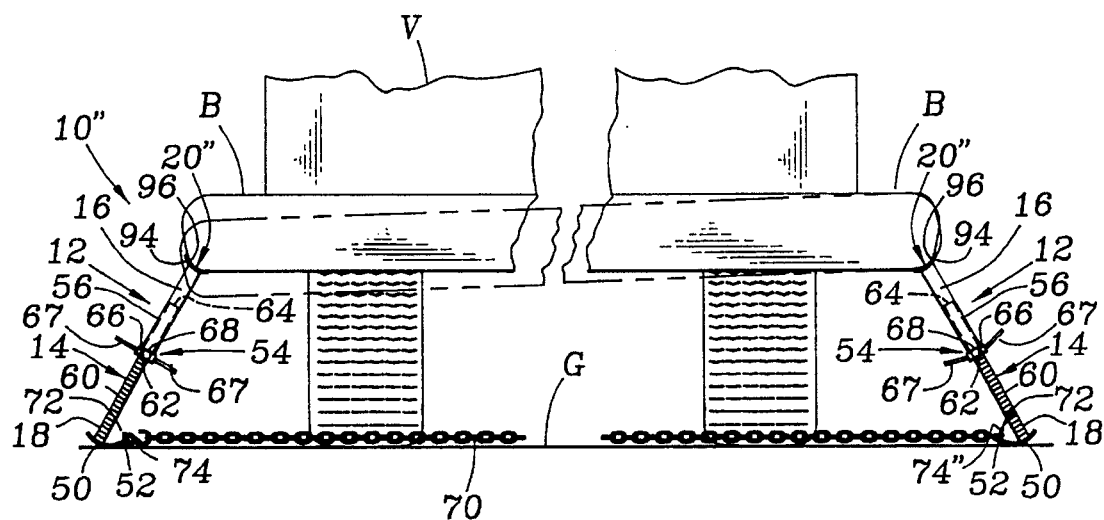
FIG. 6 is a front elevation view of a third embodiment of the invention.
Figure 5:
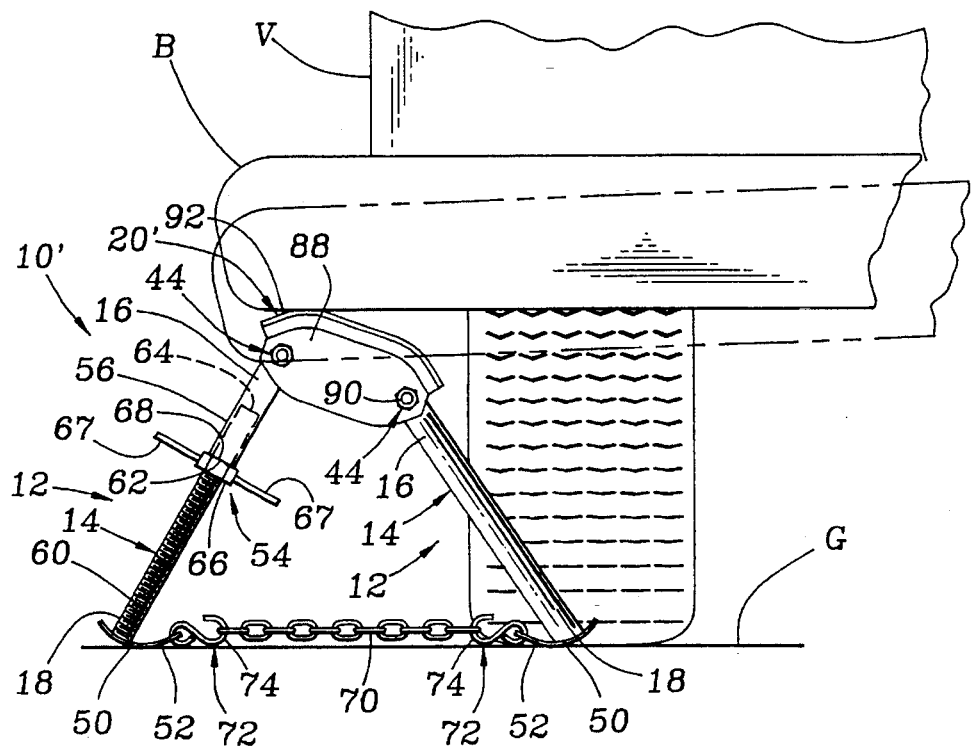
FIG. 5 is a front elevation view of a second embodiment of the invention.

FIGS. 5 and 6 show two alternative embodiments of the stabilizing apparatus indicated generally at 10' and 10" respectively. Both alternative embodiments 10' and 10" are constructed substantially similar to the apparatus 10 previously described and like reference numerals are used to indicate like structure.

Like the first embodiment 10, the apparatus 10' of FIG. 5 has a pair of stabilizing members 12 with two leg portions 14 having engaging means 20' at upper ends thereof and base means 50 at lower ends thereof. The engaging means, however, does not mount on the vehicle like the mounting bracket 22, but rather is designed to engage the underside of the vehicle's bumper B or other rigid structure of the vehicle V. The engaging means 20' instead comprises a cross member 88 extending between and pivotally interconnecting the upper ends 16 of the leg portions 14 at spaced locations via pivot pins 90, thereby fixing the spacing between the upper ends 16 and enabling the leg portions 14 to move angularly relative to one another to adjust the spacing between the lower ends 18 thereof. The cross member 88 has an upper surface 92 curved for engaging the vehicle. The leg portions 14 are constructed and function in the same manner as those described previously except that only one of the leg portions 14 is length-adjustable and the other has a fixed length. Both legs, however, could be adjustable in length.

The second embodiment of the apparatus 10' is used to stabilize and level the vehicle V by placing the apparatus 10' beneath the vehicle and engaging the upper surface 92 of cross member 88 with a rigid structural component of the vehicle V such as its bumper B. The leg portions 14 are angled downwardly and outwardly of one another with the base means 50 engaging the ground establishing a predetermined spacing between the lower ends 18 of the leg portions 14. The chain 70 is extended laterally between and connected to each of the leg portions 14 in the manner previously described to retain the leg portions 14 against further outward movement relative to one another. The adjustment nut 66 is rotated about the extension rod 60 and advanced toward the upper end 64 of the rod, reacting against the end 62 of the sleeve 56 and forcing the rod 60 to extend in prolongation of the sleeve section 56, thereby forcing the sleeve section 56 upwardly and tilting the cross member 88 applying a lifting force to the vehicle V to move it from the phantom position in FIG. 5 to the solid position thereby leveling and stabilizing the vehicle. A stabilizing apparatus 10' may be positioned at each corner of the vehicle for added stability.

The third embodiment of the apparatus 10" is shown in FIG. 6 and, like the second embodiment 10' is a portable apparatus that does not mount on the vehicle but engages the understructure of the vehicle. The third embodiment 10" is identical in construction and function to the apparatus of the first embodiment 10, except that the stabilizing members 12 are not mounted on the vehicle V by mounting brackets 22. Rather, the engaging means 20 of the third embodiment 10" comprises a pair of discrete seat members 94 secured to the upper ends 16 of the leg portions 14, each having an upwardly curving arcuate engaging surface 96 for engaging a rigid structural component of the vehicle, such as its bumper B or frame. The arcuate seats 94 have externally upturned sides that extend away from the sleeve sections 56, forming a channel or pocket for accommodating the structural component of the vehicle V and, when engaged, supporting the upper ends 16 of the leg portions 14 against relative lateral movement. The seats 94, however, allow the leg portions 14 to be adjusted angularly relative to one another to achieve the same angular relationship between the leg portions 14 as that described for the first embodiment 10. The chain 70 is attached to the lower ends 18 of the leg portions 14 in the same manner to secure the lower ends 18 against outward movement. An alternative chain mount or catch is shown in FIG. 6 and comprises a rigid post or stud 74" welded or otherwise secured to the foot 50 which extends at an angle upwardly toward the rod section 60 to permit connection of a link of the chain 70.

The stabilizing members 12 of the apparatus 10" are adjusted in length in the same manner as that described for the apparatus 10 in the first embodiment for stabilizing and leveling the vehicle. FIG. 6 illustrates adjustment of the vehicle from an initial non-level position shown in phantom lines to a level and stabilized condition shown in solid lines.

While three embodiments of the invention have been described in detail, it will be apparent to those skilled in the art that the disclosed embodiments may be modified. Therefore, the foregoing description in all aspects is to be considered exemplary rather that limiting in any way, and the true scope of the invention is that defined in the following claims.

What is claimed is:

1. Apparatus for stabilizing mobile trailers and other wheeled vehicles when parked, said apparatus comprising: a pair of independent stabilizing members each having a leg portion extending longitudinally between upper and lower ends thereof, said upper ends each mounting an upwardly curving seat for engaging the vehicle, said lower ends each mounting an upwardly curving foot for engaging the ground and supporting said leg portions in downwardly diverging angular relation to one another; each leg portion having an outer tubular sleeve section and an inner threaded rod section telescopically supported by said sleeve section, and an adjustment nut threaded on each of said rod sections for reacting forcibly between said rod and sleeve sections to adjust the overall effective length of said leg portions while under load of the vehicle; and connecting means extending laterally between and interconnecting said leg portions at a location spaced below said adjustment nuts on each said foot of said leg portions for maintaining said leg portions in said angular relation under the load of the vehicle while permitting said adjustment in the length of said leg portions.

2. The apparatus of claim 1 wherein said adjustment nut is rotatable relative to both of said sections.

3. The apparatus of claim 2 wherein said threaded extension rod section is freely slideably detachable from said sleeve section.

4. The apparatus of claim 1 wherein said connecting means comprises a flexible chain having a plurality of interconnected links.

5. The apparatus of claim 4 wherein at least one of said leg portions includes adjustable coupling means for detachably coupling any selected one of said plurality of chain links to enable adjustment in the length of said chain extending between said leg portions.

6. The apparatus of claim 5 wherein said adjustable coupling means comprises a catch secured to said foot of said one leg portion.

7. The apparatus of claim 1 wherein said adjustment nut includes handles projecting laterally from said nut.

8. The apparatus of claim 1 wherein said upwardly curving seat has a generally u-shaped arcuate configuration.

9. Apparatus for stabilizing mobile trailers and other wheeled vehicles when parked, said apparatus comprising:

a pair of adjustable-length stabilizing members each having a tubular sleeve section, a threaded rod section slideably supported within said sleeve section, and an adjustment nut threadably carried by said threaded rod section for reacting between said threaded rod and sleeve sections in response to rotating said nut to effect adjustment in the length of stabilizing members;

said stabilizing members each having an upper end and a lower end;

a generally u-shaped, upturned arcuate seat member mounted on said upper end of each stabilizing member for engaging the vehicle;

a foot member mounted on said lower end of each of said stabilizing member for making line contact with the ground, said seat and foot members enabling the stabilizing members to be positioned in any selected one of a number of relatively downwardly diverging angular positions with respect to one another; and a chain extending between and coupled to said foot members to maintain said selected angular positions of said stabilizing members and enable length adjustment of said stabilizing members under load.

* * * * *